United States Patent
Handa et al.

(10) Patent No.: US 6,461,726 B1
(45) Date of Patent: *Oct. 8, 2002

(54) LAMINATE FILM WITH ORGANIC PARTICULATE FOR A MAGNETIC RECORDING MEDIUM

(75) Inventors: Makoto Handa; Mitsuo Tojo; Toshifumi Osawa, all of Sagamihara (JP)

(73) Assignee: Teijin Limited, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/978,613

(22) Filed: Nov. 26, 1997

(30) Foreign Application Priority Data

Nov. 29, 1996 (JP) .............................................. 8-319693

(51) Int. Cl.⁷ .............................. B32B 5/16; B32B 9/00; G11B 5/66; G11B 5/70

(52) U.S. Cl. ...................... 428/327; 428/403; 428/407; 428/480; 428/694 T; 428/694 TB; 428/694 SL; 428/694 TR; 428/694 SG

(58) Field of Search ........................ 428/694 T, 694 TB, 428/900, 694 SL, 694 TR, 694 SG, 327, 323, 172, 407, 379, 403, 480

(56) References Cited

U.S. PATENT DOCUMENTS

| | | | | |
|---|---|---|---|---|
| 4,578,729 A | * | 3/1986 | Suzuki et al. ................ | 360/134 |
| 4,656,089 A | * | 4/1987 | Ninomiya et al. ........... | 428/327 |
| 4,693,932 A | * | 9/1987 | Kuze et al. .................. | 428/323 |
| 4,761,327 A | * | 8/1988 | Hammano et al. .......... | 428/220 |
| 4,810,524 A | * | 3/1989 | Nakayama et al. .......... | 427/38 |
| 4,835,032 A | * | 5/1989 | Arioka et al. ................ | 428/143 |
| 5,080,948 A | | 1/1992 | Morita et al. | |
| 5,100,719 A | * | 3/1992 | Endo et al. .................. | 428/213 |
| 5,106,681 A | * | 4/1992 | Endo et al. .................. | 428/323 |
| 5,270,096 A | * | 12/1993 | Kato et al. ................... | 428/143 |
| 5,306,538 A | * | 4/1994 | Kurihara et al. ............. | 428/141 |
| 5,384,175 A | * | 1/1995 | Kojima et al. ................ | 428/64 |
| 5,405,689 A | * | 4/1995 | Usuki et al. .................. | 428/323 |
| 5,431,983 A | * | 7/1995 | Etchu et al. ................. | 428/141 |
| 5,470,637 A | * | 11/1995 | Sakamoto et al. ........... | 428/143 |
| 5,494,739 A | * | 2/1996 | Chuujou et al. ............. | 428/323 |
| 5,510,169 A | * | 4/1996 | Greczyna et al. ............ | 428/147 |
| 5,510,192 A | * | 4/1996 | Utsumi et al. ............... | 428/480 |
| 5,587,232 A | * | 12/1996 | Hayashi et al. .............. | 428/323 |
| 5,679,453 A | * | 10/1997 | Konagaya et al. ........... | 428/327 |
| 5,965,233 A | * | 10/1999 | Tojo et al. ................... | 428/141 |
| 5,993,938 A | * | 11/1999 | Tsukuda et al. ............. | 428/141 |
| 5,998,002 A | * | 12/1999 | Harada et al. ............... | 428/216 |
| 6,124,031 A | * | 9/2000 | Yoshida et al. .............. | 428/329 |

FOREIGN PATENT DOCUMENTS

| | | |
|---|---|---|
| EP | 124 291 | 11/1984 |
| EP | 502 745 | 9/1992 |
| EP | 609 060 | 8/1994 |
| EP | 732 688 | 9/1996 |
| JP | 52134706 | 11/1977 |
| JP | 54147010 | 11/1979 |
| JP | 5616937 | 2/1981 |
| JP | 5868223 | 4/1983 |
| JP | 60180837 | 9/1985 |
| JP | 60180838 | 9/1985 |
| JP | 60180839 | 9/1985 |
| JP | 380410 | 12/1991 |
| JP | 04180921 A | * 6/1992 |
| JP | 5194772 | 8/1993 |
| JP | 5210833 | 8/1993 |

OTHER PUBLICATIONS

High Density Magnetic Recording by means of Thin Layer Particulate Media on Research of ATOMM for High density recording; Technical Report of Ieice; 1995; pp. 35–40.
Book of Particle Size Measurement Technology, pp. 242–247).

* cited by examiner

Primary Examiner—Blaine Copenheaver
Assistant Examiner—Kevin R Kruer
(74) Attorney, Agent, or Firm—Sughrue Mion, PLLC

(57) ABSTRACT

A laminate film has a coated film layer containing a binder resin and an organic filler. The laminate film satisfies the following expressions (1) and (2) when it is heated at 200° C. for 120 minutes:

$$0 \leq (Ra^1 - Ra^2)/Ra^1 < 0.4 \quad (1)$$

$$0.1 < Ra^2 < 7 \quad (2)$$

wherein $Ra^1$ is an average roughness of root mean square (nm) of an exposed surface of the coated film layer before the heat treatment, and $Ra^2$ is an average roughness of root mean square (nm) of the exposed surface of the coated film layer after the heat treatment. The film has protrusions with two or more interference fringes on the surface at a density of 100 per 100 cm² at the most. The present laminate film is useful as a base film for a magnetic recording medium.

17 Claims, No Drawings

LAMINATE FILM WITH ORGANIC PARTICULATE FOR A MAGNETIC RECORDING MEDIUM

This invention relates to a laminate film and, more specifically, to a laminate film suitable for use as a magnetic recording medium, particularly a high-density magnetic recording medium, having excellent electromagnetic conversion characteristics and durability and few drop-outs.

BACKGROUND OF THE INVENTION

In recent years, remarkable progress has been made in high-density magnetic recording, as exemplified by the development and implementation of a ferromagnetic metal thin film magnetic recording medium in which a ferromagnetic metal thin film is formed on a non-magnetic base film by a physical deposition method such as vacuum vapor deposition or sputtering, or a plating method, and a thin layer coated magnetic recording medium in which a needle-shaped magnetic powder such as a metal powder or iron oxide powder is coated on a film to a thickness of not larger than 2 μm.

Known examples of the former include a Co deposited tape (see JP-A 54-147010) (the term "JP-A" as used herein means an "unexamined published Japanese patent application") and a vertical magnetic recording medium composed of Co—Cr alloy (see JP-A 52-134706). Known examples of the latter include an extremely thin layer coated medium for high-density magnetic recording (see "Technical Report MR 94-78" (1995–02) issued by the Institute of Electronics and Communication Engineering of Japan).

Since a coated magnetic recording medium of the prior art, i.e. a magnetic recording medium, in which a mixture of magnetic powders and an organic polymer binder is coated on a non-magnetic base film, has a low recording density and a long recording wavelength, the thickness of its magnetic layer is as large as about 2 μm or more. On the other hand, a metal thin film formed by thin film forming means such as vacuum vapor deposition, sputtering or ion plating has a thickness as extremely small as 0.2 μm or less. In the case of an extremely thin layer coated medium, a coated magnetic layer is as extremely thin as 0.13 μm though a non-magnetic primary coat layer is provided.

In the above high-density magnetic recording media, the surface condition of the non-magnetic base film has a great influence on the surface characteristics of the magnetic recording layer. Particularly, in the case of a metal thin film magnetic recording medium, the surface condition of the non-magnetic base film appears directly as an uneven surface of the magnetic recording layer, which causes noise in a reproduction signal. Therefore, it is desirable that the surface of the non-magnetic base film be as smooth as possible.

Further, in the case of a deposited metal thin film magnetic recording medium, the durability of a metal thin film surface is an important factor when the medium is actually used. In the case of a coated magnetic recording medium in which magnetic powders are mixed into an organic polymer binder and the resulting mixture is coated onto the base film, the durability of the magnetic surface can be improved by mixing hard fine particles such as aluminum oxide into the binder. However, in the case of a deposited metal thin film magnetic recording medium, this measure cannot be taken, and it is extremely difficult to maintain stable durability.

As means for solving this problem, there have been proposed (1) a method for forming a discontinuous surface film by applying a specific coating to the surface of a film (see JP-B 3-80410 (the term "JP-B" as used herein means an "examined patent publication"), JP-A 60-180839, JP-A 60-180838, JP-A 60-180837, JP-A 56-16937 and JP-A 58-68223) and (2) a method for forming a continuous surface film having fine protrusions (see JP-A 5-194772 and JP-A 5-210833).

However, it is difficult to maintain sufficient durability with a discontinuous surface film alone. Also when a continuous surface film having fine protrusions is to be formed by inert fine particles, it is difficult to uniformly disperse the inert fine particles into a surface film and coarse protrusions are liable to produce by agglomerated particles, thereby deteriorating electromagnetic conversion characteristics. Thus, films produced by the above proposals still have a problem in that the quality of a magnetic tape is unstable. Further, the agglomerated particles are scraped off by their contact with a guide roll in the film formation step more easily than monodisperse particles, adhered to and accumulated on the base film thereby to produce protrusions, which causes a drop out when a magnetic tape is formed therefrom.

Generally speaking, inorganic particles are excellent in the cleaning properties of a magnetic head because they are hard and difficult to be deformed, are rarely changed in shape by heat in the tape processing step due to its high heat resistance and hence, provide excellent durability to a tape. However, they have poor affinity with a polymer and are apt to fall off. On the other hand, organic particles have lower hardness than inorganic particles though they have excellent affinity with a polymer, and the electromagnetic conversion characteristics of a tape degrade along with repeated running of the tape because all the particles undergo deformation by heat and mechanical friction.

BRIEF SUMMARY OF THE INVENTION

It is an object of the present invention to provide a laminate film which eliminates the above defects of the prior art, has excellent abrasion resistance in the film formation step and excellent electromagnetic conversion characteristics, resistance to drop-out and running durability when it is used as a base film for a deposited metal thin film magnetic recording medium or an extremely thin layer coated magnetic recording medium, for example.

It is another object of the present invention to provide a magnetic recording medium which comprises the above laminate film of the present invention as a base film and is excellent in electromagnetic conversion characteristics, resistance to drop out and running durability.

Other objects and advantages of the present invention are apparent from the following description.

According to the present invention, firstly, the above objects and advantages of the present invention can be attained by a laminate film:

(A) which comprises a film consisting of a single layer or a plurality of layers of a thermoplastic resin, and a first coated film layer present on at least one surface of the film, the first coated film layer containing a binder resin and an organic filler, (B) which satisfies the following expressions (1) and (2) at the same time when it is heated at 200° C. for 120 minutes:

$$0 \leq (Ra^1 - Ra^2)/Ra^1 < 0.4 \quad (1)$$

$$0.1 < Ra^2 < 7 \quad (2)$$

wherein $Ra^1$ is an average roughness of root mean square (nm), measured by an atomic force microscope, of an exposed surface of the first coated film layer before the heat treatment and $Ra^2$ is an average roughness of root mean square (nm), measured by the atomic force microscope, of the exposed surface of the first coated film layer after the heat treatment, and (C) in which protrusions with two or more interference fringes which can be observed when two films are superposed in such a manner that their first coated film layers come in contact with each other and exposed to light from a sodium lamp are present on the surface of each film at a density of 100 per 100 cm² at the most.

DETAILED DESCRIPTION OF THE INVENTION

In the laminate film of the present invention, the thermoplastic resin for the single layer or the plurality of layers of the film is, for example, a polyester resin, polyamide resin, polyimide resin, polyether resin, polycarbonate resin, polyvinyl resin, polyolefin resin or the like. Out of these, the thermoplastic resin is preferably a polyester resin, more preferably an aromatic polyester. The thermoplastic resin preferably has a melting point of at least 210° C.

Preferred examples of the aromatic polyester include polyethylene terephthalate, polyethylene isophthalate, polytetramethylene terephthalate, poly-1,4-cyclohexylene dimethylene terephthalate, polyethylene-2,6-naphthalene dicarboxylate and the like. Out of these, polyethylene terephthalate and polyethylene-2,6-naphthalene dicarboxylate are particularly preferred.

These polyesters may be either a homopolyester or copolyester. In the case of a copolyester, the copolymerizable component of polyethylene terephthalate or polyethylene-2,6-naphthalene dicarboxylate, for example, is a diol component such as diethylene glycol, propylene glycol, neopentyl glycol, polyethylene glycol, p-xylene glycol or 1,4-cyclohexane dimethanol; a dicarboxylic acid component such as adipic acid, sebacic acid, phthalic acid, isophthalic acid, terephthalic acid (in the case of polyethylene-2,6-naphthalene dicarboxylate), 2,6-naphthalenedicarboxylic acid (in the case of polyethylene terephthalate) or 5-sodium sulfoisophthalic acid; or an oxycarboxylic acid component such as p-oxyethoxybenzoic acid. The amount of the copolymerizable component is not more than 20 mol %, preferably not more than 10 mol %. Further, a polyfunctional compound having 3 or more functional groups, such as trimellitic acid or pyromellitic acid, may be copolymerized. In this case, the polyfunctional compound may be copolymerized in such an amount that the polymer is substantially linear, for example, in an amount of not more than 2 mol %.

The laminate film of the present invention has a first coated film layer on at least one surface of the film consisting of a single layer or a plurality of layers of the above thermoplastic resin.

The first coated film layer contains a binder resin and organic filler. The binder resin is preferably a water-soluble resin, that is, a water-soluble organic resin or water-dispersible organic resin. Illustrative examples of the water-soluble resin include aqueous alkyd resins, phenol resins, epoxy resins, amino resins, polyurethane resins, vinyl acetate resins, vinyl chloride-vinyl acetate copolymers, acryl resins, polyester resins and acryl/polyester resins. Out of these, aqueous acrylic resins, polyester resins and acryl/polyester resins are preferred from viewpoints of adhesion to the above film, protrusion retention properties and slipperiness. These aqueous resins may be a homopolymer, copolymer or mixture.

The aqueous acryl resins include polymers formed of a combination of two or more members selected from acrylic esters (alcohol residues include methyl, ethyl, n-propyl, isopropyl, n-butyl, isobutyl, t-butyl, 2-ethylhexyl, cyclohexyl, phenyl, benzyl, phenylethyl and the like); methacrylic esters (alcohol residues are the same as above); hydroxy-containing monomers such as 2-hydroxyethyl acrylate, 2-hydroxyethyl methacrylate, 2-hydroxypropyl acrylate and 2-hydroxypropyl methacrylate; amide group-containing monomers such as acrylamide, methacrylamide, N-methylmethacrylamide, N-methylacrylamide, N-methylolacrylamide, N-methylolmethacrylamide, N,N-dimethylolacrylamide, N-methoxymethylacrylamide, N-methoxymethylmethacrylamide and N-phenylacrylamide; amino group-containing monomers such as N,N-diethylaminoethyl acrylate and N,N-diethylaminoethyl methacrylate; epoxy group-containing monomers such as glycidyl acrylate, glycidyl methacrylate and allyl glycidyl ether; monomers containing a sulfonic acid group or a salt thereof such as styrenesulfonic acid, vinylsulfonic acid and salts thereof (such as sodium salt, potassium salt and ammonium salt); monomers containing a carboxyl group such as crotonic acid, itaconic acid, acrylic acid, maleic acid and fumaric acid, and salts thereof (such as sodium salt, potassium salt and ammonium salt); monomers containing an anhydride such as maleic anhydride and itaconic anhydride; and vinyl isocyanate, allyl isocyanate, styrene, vinylmethylether, vinylethylether, vinyltrisalkoxysilane, alkyl maleic monoester, alkyl fumaric monoester, acrylonitrile, methacrylonitrile, alkyl itaconic monoester, vinylidene chloride, vinyl acetate and vinyl chloride. Out of these, an acryl resin comprising 50 mol % or more of a (meth)acrylic monomer such as an acrylic acid derivative or methacrylic acid derivative, particularly methyl methacrylate, is preferred.

The aqueous acryl resin can be self-crosslinked with a functional group in the molecule or crosslinked using a crosslinking agent such as a melamine resin, epoxy compound or the like.

The aqueous polyester resins include polymers comprising, as an acid component, a polyvalent carboxylic acid such as terephthalic acid, isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, 5-sodium sulfoisophthalic acid, 2-potassium sulfoterephthalic acid, trimellitic acid, trimesic acid, trimellitic anhydride, phthalic anhydride, p-hydroxybenzoic acid or monopotassium salt of trimellitic acid and, as a hydroxy compound component, a polyvalent hydroxy compound such as ethylene glycol, propylene glycol, 1,3-propanediol, 1,4-butanediol, 1,6-hexanediol, neopentyl glycol, 1,4-cyclohexanedimethanol, p-xylyleneglycol, addition product of bisphenol A with ethylene oxide, diethylene glycol, triethylene glycol, polyethylene oxide glycol, polytetramethylene oxide glycol, dimethylolpropionic acid, glycerin, trimethylolpropane, dimethylolethyl sodium sulfonate and dimethylol potassium propanate. The polyester resins can be produced from these compounds by a conventional method. An aqueous polyester resin containing a 5-sodium sulfoisophthalic acid component or a carboxylate salt group is preferably used from a viewpoint of preparing an aqueous coating. The polyester resin may be self-crosslinked with a functional group in the molecule or crosslinked using a curing agent such as a melamine resin or epoxy resin.

Further, the term "aqueous acryl-polyester resin" is used to imply acryl modified polyester resins and polyester modified acryl resins, and for example, both graft and block type polymers in which an acryl resin component and a polyester resin component are bonded together. The acryl-polyestser resin can be produced, for example, by adding a radical initiator to both terminals of a polyester resin to polymerize acryl monomers, or adding a radical initiator to a side chain of a polyester resin to polymerize acryl monomers, or adding a hydroxyl group to a side chain of an acryl resin and reacting it with a polyester having an isocyanate group or carboxyl group at a terminal to produce a comb-like polymer, or the like.

The first coated film layer contains an organic filler in addition to the above binder resin. The organic filler preferably is ones having a deformation retention rate at 200° C. for 120 minutes of 60% or more. The organic filler is formed of a material selected from the group consisting of styrene/divinylbenzene copolymer, methyl methacrylate crosslinked copolymer, polytetrafluoroethylene, polyvinylidene fluoride, polyacrylonitrile and benzoguanamine.

In addition to the above organic fillers, there may be used particles formed by coating inorganic particles, as the core, such as silica, alumina, titanium dioxide, kaolin, talc, graphite, calcium carbonate, feldspar, molybdenum disulfide, carbon black and barium sulfate with an organic polymer. The same substances as described above can be listed as the organic polymer.

The average particle diameter of the organic filler is preferably 5 to 100 nm, more preferably 10 to 80 nm, particularly preferably 12 to 55 nm. If the average particle diameter is smaller than 5 nm, the durability of the first coated film will be insufficient, while if the average particle diameter is larger than 100 nm, the electromagnetic conversion characteristics of the magnetic recording medium will be affected adversely.

The content. of the organic filler in the first coated film is preferably 0.1 to 25% by weight, more preferably 0.5 to 20% by weight, particularly preferably 1 to 15% by weight. If the content is smaller than 0.1% by weight, durability will be insufficient due to a too small number of protrusions formed by the organic filler, whereas if the content is larger than 25% by weight, it will be difficult to retain the organic filler in the coated film layer stably, whereby the organic filler will fall off to form an adhered foreign matter. Contrarily, when the organic filler is retained in the coated film, the number of protrusions is liable to become too large with the result of making a too rough surface, thereby degrading the electromagnetic conversion characteristics of a magnetic recording medium.

The following relationship is preferably established between the thickness $t_1$ (nm) of the first coated film layer and the average particle diameter $d_1$ (nm) of the organic filler contained in the first coated film layer.

$$0.05 \leq t_1/d_1 < 1$$

When the above relationship is established, the effect of the present invention becomes further marked.

When the ratio ($t_1/d_1$) is more than 1, the effect of adding the organic filler is extremely small, while when the ratio is less than 0.05, the organic filler is apt to fall off, resulting in an increase in the number of adhered foreign matters. The ratio is preferably in the range of 0.08 to 0.80, more preferably 0.10 to 0.70, particularly preferably 0.12 to 0.50.

In the laminate film of the present invention, the first coated film layer satisfies the following equations (1) and (2) at the same time when it is heated at 200° C. for 120 minutes.

$$0 \leq (Ra^1 - Ra^2)/Ra^1 < 0.4 \quad (1)$$

$$0.1 < Ra^2 < 7 \quad (2)$$

wherein $Ra^1$ is an average roughness of root mean square (nm), measured by an atomic force microscope, of an exposed surface of the first coated film layer before the heat treatment and $Ra^2$ is an average roughness of root mean square (nm), measured by the atomic force microscope, of the exposed surface of the first coated film layer after the heat treatment.

When the value $(Ra^1 - Ra^2)/Ra^1$ is larger than 0.4, the surface of the first coated film layer becomes too flat by heat applied in the film processing step with the result that the film cannot exhibit sufficient durability. On the other hand, when the value is smaller than 0, the surface of the film is roughened by the heat treatment, thereby degrading electromagnetic conversion characteristics. The value is more preferably in the range of 0 to 0.35, more preferably 0 to 0.3, particularly preferably 0 to 0.25.

When the surface roughness ($Ra^2$) of the first coated film layer after the heat treatment is 7 nm or more, electromagnetic conversion characteristics deteriorate. On the other hand, when the value is 0.1 nm or less, the surface becomes too flat with the result of insufficient durability. The value is preferably in the range of 0.4 nm or more and less than 6 nm, more preferably 0.7 nm or more and less than 5 nm.

The laminate film of the present invention is further characterized in that protrusions showing two or more interference fringes which can be observed when two films are superposed in such a manner that their first coated film layers come in contact with each other and exposed to light from a sodium lamp are present on the surface of each film at a density of 100 per 100 cm$^2$ at the most. When the density of the protrusions is more than 100 per 100 cm$^2$, they cause drop-outs when a tape is formed therefrom. Although they are present on the side opposite to the magnetic layer side of the film, they thrust the film up from a cooling roll in the processing step, particularly in the deposition step, thereby causing the film to be broken by heat or insufficient durability due to surface flattening. The number of protrusions is preferably 80 or less, more preferably 60 or less, particularly preferably 50 or less, per 100 cm$^2$.

The first coated film layer in the present invention can be formed by applying a coating solution containing the above-described organic filler and aqueous resin, preferably an aqueous coating solution, to at least one side of a single layer or a plurality of layers of a thermoplastic resin, and drying the coating. The solid content of the coating solution is preferably 0.2 to 10% by weight, more preferably 0.5 to 5% by weight, particularly preferably 0.7 to 3% by weight. This coating solution, preferably an aqueous coating solution, may contain other components such as a surfactant, stabilizer, dispersant, UV absorber and thickener as required in limits not prejudicial to the effect of the present invention.

Preferably, coating is carried out onto a thermoplastic resin film before it is subjected to final stretching and the film is stretched in at least a uniaxial direction after coating. The coated film is dried before or during this stretching. Particularly preferably, coating is carried out onto an unstretched thermoplastic resin film or longitudinally (uniaxially) stretched thermoplastic resin film. Means of coating is not particularly limited but it is preferably roll coating, die coating or the like.

To provide excellent winding properties to the film in the present invention, a surface layer containing inert particles is preferably formed on the surface, of the thermoplastic resin film, not in contact with the first coated film layer.

The surface layer may be formed by coating or co-extrusion which will be described hereinafter. When the surface layer is formed by coating, the inert particles contained in the surface layer can be a single type of particles or two or more different types of particles which differ in size. The average particle diameter of the largest particles out of the single type or two or more types of particles is preferably 20 to 200 nm, more preferably 30 to 100 nm. The content of the inert particles in the surface layer is preferably 3 to 50% by weight, more preferably 5 to 30% by weight. When the average particle diameter of the inert particles is smaller than 20 nm or the content thereof is less than 3% by weight, the resulting film is unsatisfactory in terms of winding properties and transportability during the film formation step, and blocking readily occurs. On the other hand, when the average particle diameter is larger than 200 nm, the particles readily fall off from the coated film. When the content of the inert particles in the surface layer is larger than 50% by weight, the surface layer is readily scraped off due to a reduction in its strength.

Preferred examples of the inert particles contained in the surface layer include particles of organic materials such as silicone, polystyrene, polystyrene/divinylbenzene, polymethyl methacrylate, methyl methacrylate copolymer, methyl methacrylate crosslinked copolymer, polytetrafluoroethylene, polyvinylidene fluoride, polyacrylonitrile and benzoguanamine resins; particles of inorganic materials such as silica, alumina, titanium dioxide, kaolin, talc, graphite, calcium carbonate, feldspar, molybdenum disulfide, carbon black and barium sulfate; and particles formed by coating these inorganic particles as a core with an organic polymer.

Illustrative examples of the resin forming the coated film layer (second coated film layer) containing the above particles are the same as those listed for the aqueous resin used for the formation of the first coated film layer. The resin may further contain a cellulose resin.

When the surface layer is formed by coextrusion, the inert particles contained in the surface layer can be a single type or two or more different types of particles. The average particle diameter of the largest particles out of the single type or two or more different types of particles is preferably 100 to 1,000 nm, more preferably 100 to 500 nm. The content of the inert particles contained in the surface layer is preferably 0.001 to 5.0% by weight, more preferably 0.005 to 1.0% by weight. When the average particle diameter of the inert particles is smaller than 100 nm or the content thereof is smaller than 0.001% by weight, the resulting film is unsatisfactory in terms of winding properties and transportability in the film formation step, and blocking readily occurs. When the average particle diameter is larger than 1,000 nm or the content is larger than 5.0% by weight, the particles' effect of thrusting up into the coated film layer becomes marked with the result of deterioration in electromagnetic conversion characteristics.

Illustrative examples of the inert particles are the same as those listed for the particles used when the surface film is formed by coating.

The laminate film of the present invention can be produced by a conventionally known method or a method accumulated in the industry.

For example, in the case of a biaxially oriented polyester film of which the surface layer is formed by coating, a polyester as the thermoplastic resin is extruded into a film from a slit at a temperature of Tm to (Tm+70)° C. (Tm: melting point) and solidified by quenching at 40 to 90° C. to obtain an unstretched film. Thereafter, the unstretched film is stretched in a uniaxial direction (longitudinal or transverse direction) to 2.5 to 8.0 times, preferably 3.0 to 7.5 times, at a temperature of (Tg−10) to (Tg+70)° C. (Tg: glass transition temperature of the polyester) by a commonly used method. Thereafter, coating solutions for forming the first coated film layer and further the surface layer as the case may be are applied to both sides of the film and stretched in a direction perpendicular to the above direction to 2.5 to 8.0 times, preferably 3.0 to 7.5 times, at a temperature of Tg to (Tg+70)° C. It may be re-stretched in a longitudinal direction and/or a transverse direction as required. That is, two-, three-, four- or multi-stage stretching may be carried out. The total stretch ratio is generally 9 times or more, preferably 12 to 35 times, more preferably 15 to 32 times in terms of area stretch ratio. Subsequently, the biaxially oriented film is heat-set and crystallized at a temperature of (Tg+70) to (Tm−10)° C., e.g., at 180 to 250° C., to achieve excellent dimensional stability. The heat-set time is preferably 1 to 60 sec.

When the surface layer of the laminate film is formed by coextrusion, the surface layer is formed in the same manner as in the above case where the surface layer of the film is formed by coating except that two different polyesters for the single layer or the plurality of layers of a thermoplastic resin and for the surface layer are laminated together in a molten state within or before an extrusion slit generally called "multi-manifold system" for the former case and "feed block system" for the latter), adjusted to an appropriate thickness ratio, and coextruded into a double-layer unstretched laminate film, and a coating solution for forming the first coated film layer is applied to the film after it is stretched in a uniaxial direction. Thus, a biaxially oriented laminate polyester film having excellent interlaminar adhesion is obtained by the above method.

When the laminate film of the present invention comprises a single layer of a thermoplastic resin, this layer contains substantially no inert particles or can contain inert particles. When it contains inert particles, it preferably contains 0.005 to 0.1% by weight of inert fine particles having an average particle diameter of 20 to 400 nm and a volume shape factor of 0.1 to π/6.

When the laminate film of the present invention comprises a plurality of layers of a thermoplastic resin, a layer in contact with the first coated film layer out of the plurality of layers contains substantially no inert particles or can contain inert particles. When it contains inert particles, it preferably contains the same inert fine particles in the same proportion as described above. The inert particles are preferably inorganic particles listed above.

The layer of the thermoplastic resin can further contain other additives such as a stabilizer, colorant, resistivity control agent for a molten polymer and the like, as required.

The laminate film of the present invention generally has a thickness of 2.5 to 80 nm.

The laminate film of the present invention is advantageously used as a base film for a magnetic recording medium, preferably metal thin film magnetic recording medium.

Therefore, according to the present invention, there is further provided a magnetic recording medium comprising the laminate film of the present invention and a magnetic layer present on the first coated film layer of this laminate film.

The magnetic recording medium is preferably produced as follows. A metal thin film magnetic recording medium for high-density recording having excellent output at a short-wavelength range and electromagnetic conversion characteristics such as S/N and C/N, few drop-outs and a small error rate can be obtained from the laminate film of the present invention by forming a ferromagnetic metal thin film layer composed of iron, cobalt, chromium, an alloy or oxide mainly comprising these on the surface of the first coated film layer by means of vacuum vapor deposition, sputtering, ion plating or the like, and according to the purpose and application or as required, forming a protective layer of diamond-like carbon (DLC) or the like and a fluorine-containing carboxylic acid-based lubricant layer sequentially on the surface of the ferromagnetic metal thin film layer, and further a known back coat layer on the surface of the thermoplastic resin layer or the surface layer. This metal thin film magnetic recording medium is extremely useful as a tape medium for Hi8 for analog signal recording and digital video cassette recorders, data 8 mm and DDSIV for digital signal recording.

It is advantageous that the magnetic layer or the ferromagnetic metal thin layer should have a thickness of 1 $\mu$m or less.

A metal coated magnetic recording medium for high-density recording having excellent output at a short wave-length range and electromagnetic conversion characteristics such as S/N and C/N, few drop-outs and a small error rate can be obtained from the laminate film of the present invention by uniformly dispersing needle-shaped fine magnetic powders of iron or containing iron as a main ingredient into a binder such as vinyl chloride or vinyl chloride-vinyl acetate copolymer, and by applying the binder so as to make the thickness of a magnetic layer not larger than 1 $\mu$m, preferably 0.1 to 1 $\mu$m, and further forming a back coat layer on the surface of the thermoplastic resin layer or the surface layer by a known method. If required, titanium oxide fine particles may be dispersed into the same organic binder as that for the magnetic layer and this binder may be applied to the surface of the first coated film layer to form a non-magnetic layer as a layer underlying the metal powder-containing magnetic layer. This metal coated magnetic recording medium is extremely useful as a tape medium for 8 mm video, Hi8, β-cam SP and W-VHS for analog signal recording and digital video cassette recorders (DVC), data 8 mm, DDSIV, digital β-cam, D2, D3 and SX for digital signal recording.

A coated magnetic recording medium for high-density recording having excellent output at a short wavelength range and electromagnetic conversion characteristics such as S/N and C/N, few drop-outs and a small error rate can be obtained from the laminate film of the present invention by uniformly dispersing needle-shaped fine magnetic powders such as iron oxide or chromium oxide, or lamellar fine magnetic powders such as barium ferrite into a binder such as vinyl chloride or vinyl chloride-vinyl acetate copolymer, applying the binder so as to make the thickness of a magnetic layer not larger than 1 $\mu$m, preferably 0.1 to 1 $\mu$m, and further forming a back coat layer on the surface of the thermoplastic resin layer or the surface layer by a known method. If required, titanium oxide fine particles may be dispersed into the same organic binder as that for the magnetic layer and this binder may be applied to the surface of the coated film layer to form a non-magnetic layer as a layer underlying the metal powder-containing magnetic layer. This oxide coated magnetic recording medium is useful as a high-density oxide coated magnetic recording medium for QIC for data streamers for digital signal recording, and the like.

The above-described W-VHS is a VTR for analog HTDV signal recording and DVC can be used for digital HDTV signal recording. It can be said that the laminate film of the present invention is a base film extremely useful for a magnetic recording medium for these VTRs applicable to HDTV signals.

The following examples are given to further illustrate the present invention. Measurement methods used in the present invention are as follows.

(1) average particle diameter I of particles (average particle diameter: not smaller than 0.06 $\mu$m)

This is measured using the CP-50 Centrifugal Particle Size Analyzer of Shimadzu Corporation. A particle diameter, "equivalent spherical diameter" equivalent to 50 mass percent, is read from a cumulative curve of the particles of each diameter and the amount thereof calculated based on the obtained centrifugal sedimentation curve, and taken as the average particle diameter (refer to "Book of Particle Size Measurement Technology" issued by Nikkan Kogyo Press, pp. 242–247, 1975).

(2) average particle diameter II of particles (average particle diameter: smaller than 0.06 $\mu$m)

Particles having an average particle diameter smaller than 0.06 $\mu$m which form small protrusions are measured by a light scattering method. That is, it is expressed by the "equivalent spherical diameter" of the particles which account for 50% by weight of the total of all particles obtained by the NICOMP Model 270 Submicron Particle Sizer of Nicomp Instruments Inc.

(3) volume shape factor f

A photo of each particle is taken at a magnification corresponding to its size using a scanning electron microscope and the maximum diameter of a projection plane and the volume of the particle are calculated from the photo using a Luzex 500 Image Analyzer (a product of Nippon Regulator Co., Ltd) and a volume shape factor is calculated from the following equation.

$$f=V/d^3$$

wherein f is a volume shape factor, V is a volume ($\mu M^3$) of the particle and d is the maximum diameter ($\mu$m)-of the projection plane.

(4) layer thickness

The thickness of a film is measured at 10 locations selected at random by a micrometer and the average of the measurement values is taken as the total thickness of the film. As for the thickness of each layer, the thickness of a thin layer is measured by the following method, while the thickness of a thick layer is obtained by subtracting the thickness of the thin layer from the total thickness. That is, using a secondary ion mass spectrometer (SIMS), the concentration ratio ($M^+/C^+$) of an element ($M^{30}$) derived from particles having the highest concentration out of the particles contained in the film in the area range from the surface layer to a depth of 5,000 nm to the carbon element ($C^+$) of a polyester is taken as a particle concentration, and a portion from the surface up to a depth of 5,000 nm is analyzed in the thickness direction. In the surface layer which is interfacial, the particle concentration is measured to be low but becomes higher as the distance of the measured point from the surface increases. In the above laminate film, there are two cases: one where after the particle concentration becomes a stable value 1, it increases or decreases to a stable value 2, and the other where after the particle concentration becomes a stable value 1, it decreases continuously. Based on this distribution curve, in the former case, a depth which provides a particle concentration of (stable value 1+stable value 2)/2 is taken as the thickness of the layer whereas, in the latter case, a depth that provides a particle concentration of one-half of the stable value 1 (deeper than the depth that gives a stable value 1) is taken as the thickness of the layer.

Measurement conditions are as follows.

(i) measuring instrument secondary ion mass spectrometer (SIMS): 6300 of PERKIN ELMER Co., Ltd.

(ii) measurement conditions species of primary ion: $O^{2+}$
primary ion acceleration voltage: 12 kV
amount of primary ion current: 200 nA
luster area: 400 $\mu$m☐
analysis area: gate 30%
measured degree of vacuum: $6.0 \times 10^{-9}$ Torr
E-GUNN: 0.5 kV–3.0 A In the case where most of particles contained in an area of from the surface layer to a depth of 5,000 nm are organic polymer particles other than a silicone resin, it is difficult to measure them with SIMS. Therefore, a concentration distribution curve similar to the above is measured by FT-IR (Fourier transform infrared spectrometry) or XPS (X-ray photo-electron spectrometry) to obtain a thickness of the layer while the film is etched little by little from the surface.

The above method is effective for a coextrusion layer. In the case of a coated film layer, a film piece is overlaid with an epoxy resin and fixed, and then, an ultrathin piece having a thickness of about 60 nm is prepared by cutting the film piece in the direction parallel to the machine direction of the film, using a microtome. This sample is observed through a transmission electron microscope (H-800 supplied by Hitachi Ltd.) to obtain the layer thickness from the interface of the layer. The particle diameter of the inert particle is obtained by observing the profile of this ultrathin piece.

(5) particle diameter of inert particle (including organic filler)

100 particles B present on the surface of the coated film layer B are observed through a transmission electron microscope (H-800 of Hitachi Ltd.) to obtain the particle diameter of each of the particles B, and the average of the obtained values is taken as the particle diameter of the particles B. Here, the particle diameter of each particle is the average of a minor diameter and a major diameter thereof.

(6) average roughness of root mean square of surface measured by atomic force microscope Using the J scanner of the Nano Scope III AFM atomic force microscope of Digital Instruments Co., Ltd, Ra (average roughness of root mean square) calculated under the following conditions is measured.

probe: single bond silicon sensor
scanning mode: tapping mode
scanning range: 5 $\mu$m×5 $\mu$m
number of pixels: 256×256 data points
scanning speed: 2.0 Hz
measurement environment: room temperature, in the air The heat treatment of the film is carried out in a gear oven at 200° C. for 120 minutes.

(7) number of protrusions

Two films are superposed each other and exposed to light from a sodium lamp (wavelength of 589 nm) to observe an area of 100 cm² through an optical microscope.

The number of protrusions showing two or more interference fringes which can be observed is counted, and the protrusions are photographed and marked. The two films are then separated from each other, pressurized air is blown against their contact surfaces, marked protrusions are observed through an optical microscope again, and the number of remaining marked protrusions is counted. The number of the object protrusions is obtained by subtracting the count value after pressurized air is blown from the first count value.

(8) production of magnetic tape and evaluation of its characteristic properties

Two 100% cobalt ferromagnetic thin film layers are formed on the surface of the coated film layer of a laminate film so as to have a total thickness of 0.02 $\mu$m (each layer has a thickness of about 0.1 $\mu$m) by vacuum vapor deposition. A diamond-like carbon (DLC) film layer and a fluorine-containing carboxylic acid-based lubricant layer are formed sequentially on the surface of the thin film layers, and a back coat layer is further formed on the surface of the thermoplastic resin or the surface layer by a known method. Thereafter, the resulting laminate is slit into an 8 mm wide tape which is then loaded into a commercially available 8 mm video cassette. Then, the characteristic properties of this tape are measured using the following trade measuring instruments.

Instruments used:

8 mm video tape recorder: EDV-6000 of Sony Corporation

C/N measurement: noise meter of Shibasoku Co., Ltd.

(i) C/N measurement

A signal having a recording wavelength of 0.5 $\mu$m (frequency of about 7.4 MHz) is recorded, the ratio of values of its reproduced signal at 6.4 MHz and 7.4 MHz is taken as the C/N of a tape, and the C/N is expressed as a relative value of when the C/N of a deposited tape for a commercial 8 mm video is 0 dB, and is evaluated based on the following criteria.

◎: +2 dB or more
○: −1 to +2 dB
×: less than −2 dB (ii) drop-out (D/O) measurement Using a drop-out counter, the number of drop-outs per minute at 12 $\mu$s/15 dB is measured.

◎: 0 to 19 drop-outs per minute
○: 20 to 39 drop-outs per minute
×: 40 or more drop-outs per minute (3) still durability C/N is measured after recording and reproduction are repeated 500 times at a running speed of 85 cm/min at 23° C. and 20% RH and a difference from the initial value is evaluated based on the following criteria.

◎: above +0.0 dB based on the initial value
○: −2.0 to +0.0 dB based on the initial value
×: less than −2.0 dB based on the initial value 9) deformation retention rate (%)

This is the rate (%) of the height of the particle B on the surface of a film after a heat treatment in a gear oven at 200° C. for 120 minutes to the height of the particle B before the heat treatment.

The height of the particle B is measured as follows. A film piece is overlaid with an epoxy resin and fixed, and then, an ultrathin sample having a thickness of about 60 nm is prepared by cutting the film piece in the direction parallel to the machine direction of the film and the thickness direction of the film, using a microtome. This sample is observed through a transmission electron microscope (H-800 of Hitachi Ltd.) to measure the particle diameters of 100 particles B in the direction perpendicular to the surface of the film, and the average of the measurement values is taken as the height of the particle B.

EXAMPLE 1

Dimethyl 2,6-naphthalene dicarboxylate and ethylene glycol were polymerized in accordance with a commonly used method by adding manganese acetate as an ester exchange catalyst, titanium trimellitate as a polymerization catalyst, phosphorous acid as a stabilizer, and inert particles shown in Table 1 as a lubricant to obtain polyethylene-2,6-naphthalate (PEN) having an intrinsic viscosity of 0.60 for a thermoplastic resin film layer and a surface layer (designated as layer A and layer C, respectively).

The resin A and the resin C were dried at 170° C. for 6 hours, supplied to two extruders, molten at 290 to 310° C. and laminated together using a multimanifold extrusion die in such a manner that the layer C was laminated on one side of the layer A. The resulting laminate was quenched to obtain a 94 μm-thick unstretched laminate film.

The obtained unstretched film was preheated, stretched to 3.8 times between high-speed and low-speed rolls at a film temperature of 130° C. and quenched, and an aqueous coating solution (total solid content of 1.0% by weight) having a composition shown in Table 1 was applied to the surface of the layer A of the longitudinally stretched film by kiss-roll coating. The coated film was supplied to a stenter and stretched to 5.5 times in a transverse direction at 150° C. The obtained biaxially oriented film was heat set with hot air heated at 200° C. for 4 seconds to obtain a 4.5 μm-thick biaxially oriented laminate polyester film having the first coated film layer (layer B). The thickness of each of the layers A and C was adjusted by controlling the discharge to the two extruders. The film had a Young's modulus of 580 kg/mm² in a longitudinal direction and 1,050 kg/mm² in a transverse direction.

The surface properties of this laminate film and the characteristic properties of a ferromagnetic thin film deposited magnetic tape comprising this film are shown in Table 2.

EXAMPLE 2 AND COMPARATIVE EXAMPLES 1 TO 4

Laminate films were obtained in the same manner as in Example 1 except that the inert particles contained in the layers A and C and the thickness of each layer were changed as shown in Table 1 and the composition of the first coated film layer (layer B) was changed as shown in Table 1. The characteristic properties of the obtained films and the characteristic properties of ferromagnetic thin film deposited-magnetic tapes comprising these films are shown in Table 2.

EXAMPLES 3 AND 4

Polyethylene-2,6-naphthalate (PEN) for the layer A was obtained in the same manner as in Example 1 by adding inert particles shown in Table 1 to the layer A and supplied to one extruder to obtain unstretched single-layer films.

The thus obtained unstretched films were preheated, stretched to 3.5 times between high-speed and low-speed rolls at a film temperature of 135° C. and quenched, and an aqueous coating solution having a composition shown in Table 1 for the coated film layer B was applied to both sides of the film by kiss-roll coating. The coated films were supplied to a stenter and stretched to 3.5 times in a transverse direction at 150° C. The obtained biaxially oriented films were heat set with hot air heated at 220° C. for 5 seconds to obtain laminate films.

EXAMPLES 5 AND 6 AND COMPARATIVE EXAMPLE 5

Polyethylene terephthalate (PET) for the layers A and C (layer A and layer C) was obtained in the same manner as in Example 1 except that the same molar amount of dimethyl terephthalate was used in place of 2,6-naphthalene dimethyl dicarboxylate and particles shown in Table 1 were used as the inert particles.

The resins for layers A and C were dried at 170° C. for 3 hours and thickness thereof were adjusted in the same manner as in Example 1 to obtain unstretched laminate films.

The thus obtained unstretched laminate films were preheated, stretched to 3.3 times between high-speed and low-speed rolls at a film temperature of 100° C. and quenched, and an aqueous coating solution having a composition shown in Table 1 for the coated film layer B was applied to the surface of the layer A. The coated films were then supplied to a stenter and stretched to 4.2 times in a transverse direction at 110° C. The obtained biaxially oriented films were heat set with hot air heated at 220° C. for 3 seconds to obtain biaxially oriented laminate polyester films.

The characteristic properties of the thus obtained films and the characteristic properties of ferromagnetic thin film deposited magnetic tapes comprising these films are shown in Table 2.

TABLE 1a

| | | Thermoplastic resin film layer A | | | | Coated film layer B | | | |
| | | | Inert particles A | | | | | Inert particles B | |
| | | | | | | | Material | | Average | |
| | Kind | Material | Average particle diameter (nm) | Volume shape factor | Content (wt %) | Kind | Core portion | Cover portion | particle diameter (nm) | Content (wt %) |
|---|---|---|---|---|---|---|---|---|---|---|
| Ex. 1 | PEN | Silica | 80 | 0.5 | 0.02 | A | Pst-DVB copolymer | PMMA | 32 | 5 |
| Ex. 2 | PEN | — | — | — | — | A | Silica | PMMA | 18 | 10 |
| Ex. 3 | PEN | — | — | — | — | B | Pst-DVB copolymer | PMMA | 24 | 8 |
| Ex. 4 | PEN | Silicone | 40 | 0.4 | 0.04 | C | PMMA-DVB copolymer | — | 45 | 3 |
| Ex. 5 | PET | Silica | 120 | 0.5 | 0.05 | B | Pst-DVB copolymer | PMMA | 43 | 5 |
| Ex. 6 | PET | Silica | 60 | 0.5 | 0.03 | A | PMMA-DVB copolymer | Pst | 28 | 12 |
| Comp. | PEN | Silica | 80 | 0.5 | 0.02 | A | Pst | PMMA | 32 | 5 |

TABLE 1a-continued

| | Thermoplastic resin film layer A | | | | | Coated film layer B | | | | |
|---|---|---|---|---|---|---|---|---|---|---|
| | | Inert particles A | | | | | Inert particles B | | | |
| | | | Average particle diameter (nm) | Volume shape factor | Content (wt %) | | Material | | Average particle diameter (nm) | Content (wt %) |
| | Kind | Material | | | | Kind | Core portion | Cover portion | | |
| Ex. 1 Comp. Ex. 2 | PEN | Silica | 80 | 0.5 | 0.02 | A | Silica | PMMA | 40 | 30 |
| Comp. Ex. 3 | PEN | — | — | — | — | — | — | — | — | — |
| Comp. Ex. 4 | PEN | — | — | — | — | A | Silica | — | 18 | 10 |
| Comp. Ex. 5 | PET | — | — | — | — | A | Pst-DVB copolymer | PMMA | 43 | 10 |

TABLE 1b

| | Surface film layer C | | | | | | | | |
|---|---|---|---|---|---|---|---|---|---|
| | Inert particles layer C | | | Other particles | | | Composition of thickness | | |
| | | | Average particle diameter (Nm) | | Average particle diameter (Nm) | | Layer A (μm) | Layer B (μm) | Layer C (μm) |
| | Kind | Material | | Content (wt %) | Kind | | Content (wt %) | | |
| Ex. 1 | PEN | Silicone | 500 | 0.02 | silica | 100 | 0.4 | 4 | 4 | 500 |
| Ex. 2 | PEN | Silica | 400 | 0.02 | θ-alumina | 50 | 0.3 | 3 | 3 | 1000 |
| Ex. 3 | B | same with inert particle B | 24 | 8 | — | — | — | 63 | 8 | 8 |
| Ex. 4 | C | same with inert particle B | 45 | 3 | — | — | — | 32 | 10 | 10 |
| Ex. 5 | PET | Silicone | 500 | 0.2 | θ-alumina | 70 | 0.2 | 8 | 8 | 2000 |
| Ex. 6 | PET | Silicone | 700 | 0.1 | titanium oxide | 200 | 0.3 | 6 | 5 | 500 |
| Comp. Ex. 1 | PEN | Silicone | 500 | 0.02 | silica | 100 | 0.3 | 4 | 4 | 500 |
| Comp. Ex. 2 | PEN | Silicone | 500 | 0.02 | silica | 60 | 0.5 | 4 | 10 | 500 |
| Comp. Ex. 3 | PEN | Silicone | 500 | 0.2 | silica | 160 | 0.2 | 4 | — | 500 |
| Comp. Ex. 4 | PEN | Silicone | 500 | 0.02 | θ-alumina | 90 | 0.3 | 3 | 3 | 1000 |
| Comp. Ex. 5 | PET | Silicone | 500 | 0.2 | silica | 45 | 0.3 | 8 | 1 | 2000 |

TABLE 2

| | Film strength | | | Surface roughness of coated film layer B (AFM) | | | | | |
|---|---|---|---|---|---|---|---|---|---|
| | Young's modulus (MD/TD) (kg/mm$^2$) | Number of foreign matters per 100 cm$^2$ | tB/dB | Before heat treatment (nm) | After heat treatment (nm) | Rate of change | Electromagnetic conversion characteristics | Drop-out | Still durability |
| Ex. 1 | 560/1050 | 21 | 0.13 | 2.5 | 1.7 | 0.32 | ○ | ○ | ○ |
| Ex. 2 | 580/1050 | 15 | 0.17 | 1.6 | 1.5 | 0.06 | ⊙ | ○ | ⊙ |
| Ex. 3 | 650/650 | 8 | 0.33 | 1.9 | 1.3 | 0.32 | ⊙ | ⊙ | ○ |
| Ex. 4 | 650/650 | 32 | 0.22 | 3.1 | 3.0 | 0.03 | ○ | ○ | ⊙ |
| Ex. 5 | 500/700 | 45 | 0.19 | 2.3 | 1.8 | 0.22 | ○ | ○ | ⊙ |
| Ex. 6 | 500/700 | 26 | 0.18 | 1.8 | 1.6 | 0.11 | ⊙ | ○ | ○ |
| Comp. Ex. 1 | 580/1050 | 14 | 0.13 | 2.5 | 1.2 | 0.52 | ⊙ | ○ | x |
| Comp. Ex. 2 | 580/1050 | 28 | 0.25 | 7.8 | 7.2 | 0.08 | x | ○ | ○ |

TABLE 2-continued

| | Film strength | | | Surface roughness of coated film layer B (AFM) | | | | | |
|---|---|---|---|---|---|---|---|---|---|
| | Young's modulus (MD/TD) (kg/mm$^2$) | Number of foreign matters per 100 cm$^2$ | tB/dB | Before heat treatment (nm) | After heat treatment (nm) | Rate of change | Electromagnetic conversion characteristics | Drop-out | Still durability |
| Comp. Ex. 3 | 580/1050 | 10 | — | 1.2 | 1.2 | 0.00 | ⊚ | ⊚ | x |
| Comp. Ex. 4 | 580/1050 | 460 | 0.17 | 1.7 | 1.6 | 0.06 | ○ | x | ○ |
| Comp. Ex. 5 | 500/700 | 165 | 0.02 | 2.1 | 1.7 | 0.19 | ○ | x | ○ |

In the above Tables, "Ex." stands for Example and "Comp.Ex." for Comparative Example.

Notes

Kind of Resins of Coated Film Layer B and Surface Layer C

A: acryl modified polyester (IN-170-6 of Takamatsu Yushi K.K.)

B: water-soluble polyester (RZ-530 of Goh Kagaku K.K.)

C: water-dispersible polyester (2,6-naphthalenedicarboxylic acid/isophthalic acid/5-sodium sulfoisophthalic acid/ethylene glycol/addition product of bisphenol A with 2-mols of propylene oxide)

Material of Inert Particle B

Pst: polystyrene

Pst-DVB: polystyrene-divinylbenzene copolymer

PMMA: polymethylmethacrylate

PMMA-DVB: polymethylmethacrylate-divinylbenzene copolymer

As is evident from Table 2, the laminate film of the present invention is extremely excellent in electromagnetic conversion characteristics, resistance to drop out and still durability when it is used as a magnetic recording medium. On the other hand, a laminate film which does not satisfy the requirements of the present invention cannot achieve these excellent properties at the same time.

According to the present invention, there can be provided a laminate film which is useful as a base film for a magnetic recording medium having excellent electromagnetic conversion characteristics, resistance to drop out and still durability.

What is claimed is:

1. A laminate film:

(A) which comprises a film comprising a single layer or a plurality of layers of a thermoplastic resin and a first coated film layer present on at least one surface of the film, the first coated film layer containing a binder resin and an organic filler, said organic filler consisting of an organic cover portion and a core portion, wherein said organic cover portion is selected from the group consisting of polymethyl methacrylate and polystyrene and said core portion is selected from the group consisting of polystyrene-divinylbenzene copolymer and polymethyl methacrylate-divinylbenzene copolymer, (B) which satisfies the following expressions (1) and (2) at the same time when it is heated at 200° C. for 120 minutes:

$$0 \leq (Ra^1 - Ra^2)/Ra^1 < 0.4 \quad (1)$$

$$0.1 < Ra^2 < 7 \quad (2)$$

wherein $Ra^1$ is an average roughness of root mean square (nm), measured by an atomic force microscope, of an exposed surface of the first coated film layer before the heat treatment, and $Ra^2$ is an average roughness of root mean square (nm), measured by the atomic force microscope, of the exposed surface of the first coated film layer after the heat treatment, and (C) in which protrusions with two or more interference fringes which can be observed when two films of the type recited in paragraphs (A) and (B) are superposed in such a manner that their first coated film layers come in contact with each other and exposed to light from a sodium lamp are present on the surface of each film at a density of 100 per 100 cm$^2$ at the most.

2. The laminate film of claim 1, wherein the thermoplastic resin has a melting point of at least 210° C.

3. The laminate film of claim 1, wherein the organic filler present in the first coated film layer has a deformation retention rate at 200° C. for 120 minutes of 60% or more.

4. The laminate film of claim 1, wherein the organic filler contained in the first coated film layer has an average particle diameter of 5 to 100 nm.

5. The laminate film of claim 1, wherein the following relationship is established between the thickness $t_1$ (nm) of the first coated film layer and the average particle diameter $d_1$ (nm) of the organic filler contained in the first coated film layer:

$$0.05 \leq t_1/d_1 < 1.$$

6. The laminate film of claim 1, wherein the organic filler is contained in an amount of 0.1 to 25% by weight in the first coated film layer.

7. The laminate film of claim 1, wherein the binder resin is at least one aqueous resin selected from the group consisting of acryl resins, polyester resins and acryl/polyester resins.

8. The laminate film of claim 1, wherein a second coated film layer containing inert particles is further present on the surface of the film not in contact with the first coated film layer.

9. The laminate film of claim 1, wherein the single layer or a layer in contact with the first coated film layer out of the plurality of layers of the thermoplastic resin contains substantially no inert particles.

10. The laminate film of claim 1, wherein the single layer or a layer in contact with the first coated film layer out of the plurality of layers of the thermoplastic resin contains 0.005 to 0.1% by weight of inert fine particles having an average particle diameter of 20 to 400 nm and a volume shape factor of 0.1 to $\pi/6$.

11. The laminate film of claim 1 having a thickness of 2.5 to 80 μm.

12. A method of using a laminate film, comprising supplying the laminate film of claim 1 as a base film for a magnetic recording medium.

13. The method of claim 12, wherein the magnetic recording medium is a metal thin film magnetic recording medium.

14. A magnetic recording medium comprising the laminate film of claim 1 and a magnetic layer present on the first coated film layer of the laminate film.

15. The magnetic recording medium of claim 14 which is a metal thin film magnetic recording medium.

16. The magnetic recording medium of claim 14, wherein a magnetic layer has a thickness of 1 μm or less.

17. The magnetic recording medium of claim 14 for use in Hi8 for analog signal recording and a digital video cassette recorder, data 8 mm and DDSIV for digital signal recording.

* * * * *